United States Patent
Drane

(10) Patent No.: US 7,157,643 B2
(45) Date of Patent: Jan. 2, 2007

(54) FLOOR BOX WITH VOLTAGE DIVIDER

(75) Inventor: Mark R. Drane, Germantown, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/194,980

(22) Filed: Aug. 2, 2005

(65) Prior Publication Data

US 2006/0027386 A1 Feb. 9, 2006

Related U.S. Application Data

(60) Provisional application No. 60/598,995, filed on Aug. 5, 2004.

(51) Int. Cl.
*H02G 3/14* (2006.01)
(52) U.S. Cl. .......................... 174/66; 174/67; 220/241; D8/350; D13/143
(58) Field of Classification Search ............. 174/66, 174/67; 220/241, 242; D8/350, 351; D13/143, D13/147
See application file for complete search history.

(56) References Cited

U.S. PATENT DOCUMENTS

| | | |
|---|---|---|
| 1,296,811 A | 3/1919 | Keller |
| 3,371,149 A | 2/1968 | Maxted |
| 4,041,238 A | 8/1977 | Penczak |
| 4,194,332 A | 3/1980 | Fork |
| 4,297,524 A | 10/1981 | Fork |
| 4,338,484 A | 7/1982 | Littrell |
| 4,433,204 A * | 2/1984 | Wuertz ...................... 174/483 |
| 4,455,449 A | 6/1984 | Rendel |
| 4,499,332 A | 2/1985 | Shea et al. |
| 4,770,643 A | 9/1988 | Castellani et al. |
| 5,003,127 A | 3/1991 | Sosinski et al. |
| 5,285,009 A | 2/1994 | Bowman et al. |
| 5,362,922 A | 11/1994 | Whitehead |
| 5,455,388 A | 10/1995 | Pratt |
| 5,466,886 A | 11/1995 | Lengyel et al. |
| 5,468,908 A | 11/1995 | Arthur et al. |
| 5,486,650 A * | 1/1996 | Yetter ........................ 174/53 |
| 5,594,207 A | 1/1997 | Fabian et al. |
| 5,627,340 A | 5/1997 | Smith et al. |
| 5,796,037 A | 8/1998 | Young et al. |
| 5,831,212 A | 11/1998 | Whitehead et al. |
| 6,194,658 B1 | 2/2001 | Duval |
| 6,259,020 B1 | 7/2001 | Ashline et al. |
| 6,274,809 B1 | 8/2001 | Pudims et al. |
| 6,395,978 B1 | 5/2002 | Whitehead et al. |
| 6,395,981 B1 | 5/2002 | Ford et al. |
| 6,610,927 B1 | 8/2003 | Dinh et al. |
| 6,653,561 B1 | 11/2003 | Lalancette et al. |
| D484,097 S | 12/2003 | Drane et al. |
| 6,835,890 B1 * | 12/2004 | Dinh et al. ................... 174/66 |
| 6,840,785 B1 | 1/2005 | Drane |
| 6,843,669 B1 | 1/2005 | Drane et al. |

* cited by examiner

*Primary Examiner*—Dhiru R. Patel
(74) *Attorney, Agent, or Firm*—Hoffman & Baron, LLP

(57) ABSTRACT

An outlet box assembly for termination of electrical and communication wires which generally includes a box having a floor and a sidewall extending upwardly from the floor, a cover attached to the box and a divider attached to the cover between the box floor and the cover. The box defines an interior therein and the cover at least partially encloses the interior. The divider divides the box interior into first and second wiring compartments adapted to respectively contain electrical and communication wires therein.

21 Claims, 7 Drawing Sheets

FLOOR BOX WITH VOLTAGE DIVIDER

CROSS-REFERENCE TO RELATED APPLICATIONS

This application claims the benefit of U.S. Provisional Application No. 60/598,995, filed on Aug. 5, 2004.

FIELD OF THE INVENTION

The present invention relates generally to an electrical outlet box which houses power and communication wires for termination. More specifically, the present invention relates to an electrical floor box assembly having a divider for effectively isolating power wires from communication wires within the floor box.

BACKGROUND OF THE INVENTION

It is well known to use electrical outlet boxes to terminate electrical wires and cables. Such outlet boxes permit the insertion of electrical wires into the box, which are terminated to electrical fixtures, such as switches and receptacles in an electrical outlet box. It has also become necessary to terminate communications wires for such purposes as data, voice and signal transmission and networking computers. While terminations are not required to be housed in an electrical box, as are electrical terminations, aesthetics and convenient usage has dictated the need to place the communication terminations in close proximity to the electrical terminations.

In office spaces and other commercial environments it is often desired to have access to electrical outlets or other electrical connections at locations located a distance from standard wall outlets. In order to safely accommodate such situations, floor boxes are typically used. These boxes may be located in the floor near or at the location, such as under a work cubicle or near a piece of machinery, where the connection is needed.

Such floor boxes are typically designed to be supported within a poured concrete floor. One of the problems in positioning a floor box is that the installer must assure that the floor box is both flush and level with the top of the poured floor in which it is set. In the prior art, it is known to provide floor boxes which are set in poured concrete floors and then sawed off to accommodate the depth of the poured floor. Other floor boxes may include a flange which sits on top of the floor surface and include an opening to permit access to the electrical connections. A cover is typically removably positionable over the opening to prevent inadvertent contact with the connectors and to restrict debris from contaminating the connectors.

The art has developed various boxes and housing which provide for both the accommodation of electrical terminations as well as communication terminations. Examples of outlet boxes which house electrical terminations and also support communication terminations are shown, for example, in U.S. Pat. Nos. 5,354,953; 5,646,371; 5,783,774 and 5,598,998. As seen in these patents, the electrical termination is separated from the communications terminations by a solid wall. Typically, this wall is formed by the outside wall of the box which houses the electrical terminations where the electrical terminations are held inboard of the outlet box and the communications terminations are supported outboard of the outlet box. Thus, such prior art floor boxes generally require complicated assemblies to be placed within the floor box so as to maintain adequate physical separation between the different services within the box.

Common practices and the need to use standard uniform components to cover the outlet box and provide for the ability to readily interconnect to the terminated wires requires that the distance between the electrical termination and the communications termination be fixed. Also, relevant electrical codes dictate the minimum distance that the receptacle need be spaced from the side walls of the outlet box. In the electrical outlet boxes, the art has seen the need to increase the total interior capacity of the box so as to accommodate larger numbers of wires and terminations. With respect to dual voltage boxes, it has become difficult to simultaneously increase the usable interior space of the electrical outlet box while maintaining proper spacing between the electrical termination and the communications termination. Attempts to adjust the receptacle within the outlet box may result in the receptacle being positioned either too close to one of the side walls or outside the required distance from the communications termination.

It is therefore desirable to provide a floor box for use within the poured concrete floor which effectively partitions data/communication wires from power wires and which is easy to assemble and more versatile to use.

SUMMARY OF THE INVENTION

It is an object of the present invention to provide an electrical floor box assembly.

It is also an object of the present invention to provide an in-floor outlet box which accommodates and separates the power wires and data/communication wires.

It is a further object of the present invention to provide a service divider which is selectively positionable within the outlet box for separating the power wires and data/communication wires therein.

The present invention is an outlet box assembly for termination of electrical and communication wires. The outlet box assembly generally includes a box including a floor and a sidewall extending upwardly from the floor, a cover attached to the box and a divider attached to the cover between the box floor and the cover. The box defines an interior therein and the cover at least partially encloses the interior. The divider divides the box interior into first and second wiring compartments adapted to respectively contain electrical and communication wires therein.

In a preferred embodiment, the divider is removably attachable to the cover while the cover is attached to the box. Also, the box sidewall preferably forms an inner corner partially separating the first wiring compartment from the second wiring compartment and the divider abuts against the corner to divide the first and second wiring compartments. In this regard, the divider may include a groove formed in a lateral edge thereof for receiving the inner corner of the box and an aperture formed in an upper edge thereof for securing the divider to the cover.

The box floor and sidewall preferably form a box interior having a generally rectangular central space and four generally rectangular compartments extending diametrically outward from the central space. The outlet box assembly may further include a panel disposed between the box floor and the cover for enclosing at least one of the wiring compartments. In this case, the divider preferably includes an abutment surface for abutting the panel thereagainst.

The divider may be provided a plurality of score lines disposed thereon for facilitating adjustment of the height of the divider to match a height of the box sidewall. These score lines preferably take the form of creases to facilitate breaking off a portion of the divider.

The present invention further involves a method for separating electrical wires from communication wires contained together in an outlet box assembly. The method generally includes the steps of forming a box including a floor and a sidewall extending upwardly from the floor, attaching a cover to the box to at least partially enclose the box interior, inserting a divider between the box floor and the cover after attachment of the cover to the box, providing electrical wires in the first wiring compartment and providing communication wires in the second wiring compartment. The divider is attached to the cover for dividing the box interior into first and second wiring compartments, wherein the electrical wires are separated from the communication wires by the divider.

As a result of the present invention, an in-floor electrical/communication outlet box assembly which accommodates and separates power wires and data/communication wires is provided. The box assembly includes an outlet floor box positionable within a floor, a box cover and at least one divider for separating power wires and data/communication wires contained within the outlet floor box. The outlet floor box includes a floor and a perimetrical side wall defining a cross-shaped box interior forming diametrically opposed wiring compartments. The divider is installed at a corner of the side wall between two adjacent wiring compartments to form a barrier between the compartments. The divider includes an aperture at a top edge thereof for securing the divider to the box cover from above with a screw. The box includes a plurality of access ports for providing separate entry of power and data/communication wires into the interior of the box.

The preferred embodiments of the floor box with voltage divider as well as other objects, features and advantages of this invention, will be apparent from the following detailed description, which is to be read in conjunction with the accompanying drawings.

DETAILED DESCRIPTION OF THE PREFERRED EMBODIMENTS

Figure 1:
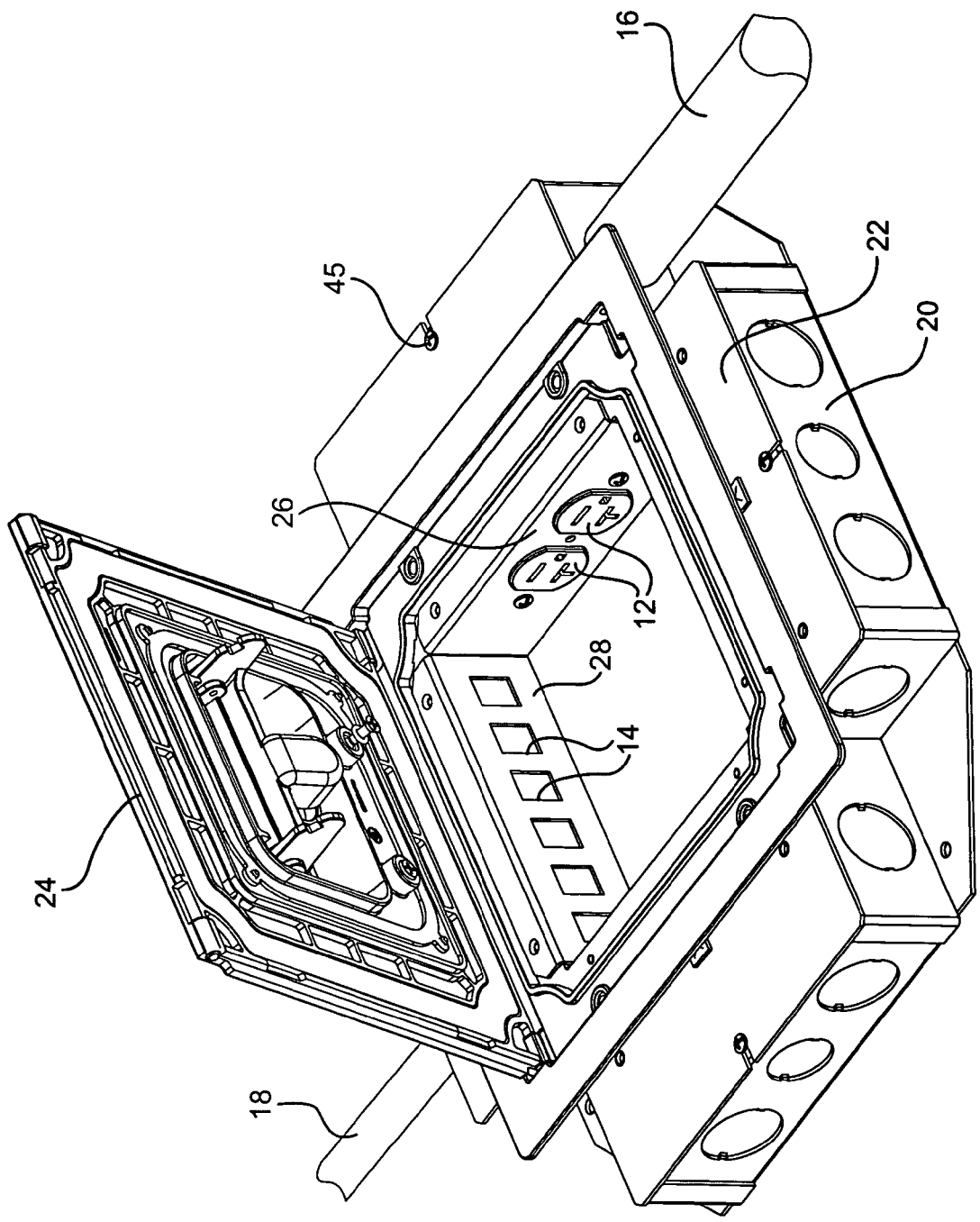
FIG. 1 is a top perspective view of a fully assembled electrical floor box assembly formed in accordance with the present invention.

Referring first to FIG. 1, the electrical floor box assembly 10, formed in accordance with the present invention, is shown in its fully assembled condition. A floor box assembly is described herein, however, the invention is not limited to only floor boxes. For example, the present invention may be adapted for mounting to any other structures, such as ceilings and walls.

The dual voltage electrical outlet box assembly 10 provides for the accommodation of both electrical fixtures 12, such as switches or receptacles, and communication fixtures 14, such as data plugs, coaxial connectors, fiber optic connectors and the like, which provide for termination of voice, data or signal wires. An electrical conduit 16 is connected to the box 10 for feeding electrical lines to the electrical fixtures 12 and a communication conduit 18 is connected to the box for feeding communication lines to the communication fixtures 14.

The electrical floor box assembly 10 generally includes a floor box 20, a box cover 22 attached to the floor box, a hinged lid 24 attached to the cover, one or more electrical panels 26 attached to the cover and one or more communication panels 28 attached to the cover. The electrical fixtures 12 are mounted to the electrical panels 26 and the communication fixtures 14 are mounted to the communication panels 28. The hinged lid 24 can be pivoted and secured to the box cover 22 to protect the interior of the box 10.

Figure 2:
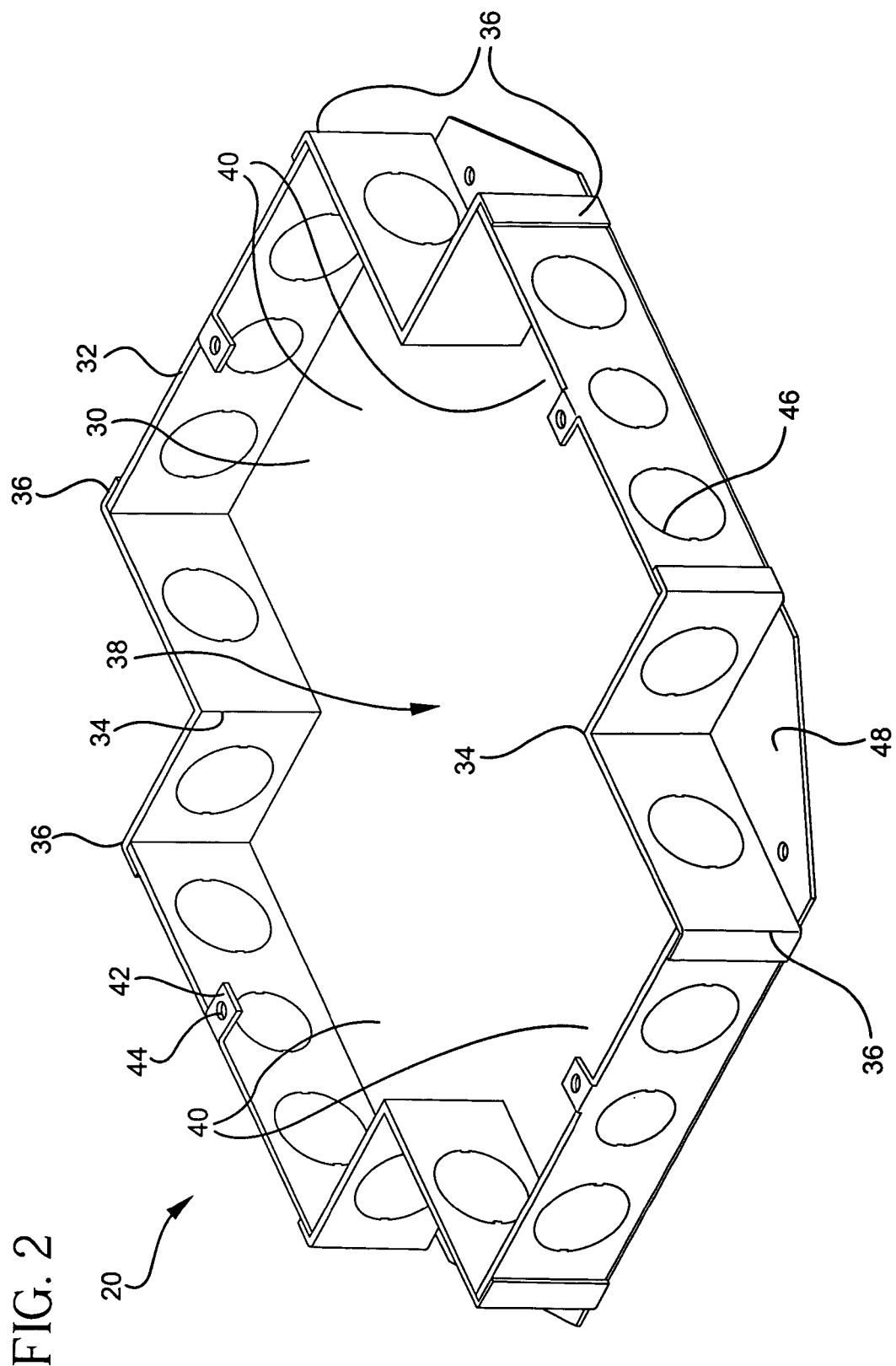
FIG. 2 is a top perspective view of the floor box alone.

Turning to FIG. 2, the floor box 20 may be formed of a wide variety of materials as is well known in the art. For example, the floor box 20 may be formed of a suitable integrally molded plastic, such as polyvinylchloride (PVC), and may be formed in a wide variety of known plastic forming techniques. In the particular example shown herein, the box assembly 20 is made from sheet metal bent and spot-welded in the configuration shown. The floor box 20 includes a floor 30 and a continuous perimetrical side wall 32 extending perpendicularly upward from the floor. The side wall 32 forms a cross shape defined by four inner corners 34 and eight outer corners 36 of the side wall. Thus, the floor 30 and the side wall 32 form a box interior having a generally rectangular central space 38 and four generally rectangular compartments 40 extending diametrically outward from the central space. As will be discussed in further detail below, the compartments 40 will form wiring compartments for containing the wiring of either an electrical fixture 12 or a communication fixture 14.

The side wall 32 further preferably includes opposed inwardly directed mounting elements 42, each having a central screw threaded aperture 44 therethrough. The mounting elements 42 extend from the upper edge of the side wall, opposite the floor, and permit the attachment of the box cover 22 with screws 45 in a conventional manner. Also, as is well known in the art, the side wall 32 of the floor box 20 may include one or more access openings 46 which permit entry of electrical wires and cables (not shown in FIG. 2) into the box interior. Additionally, the floor 30 of the box 20 may extend outwardly beyond the side wall 32 to form mounting flanges 48 which allow the box to be secured to a building floor joist or the like in a conventional fashion by use of a fastener such as a nail or screw.

The floor box 20 is positioned onto an understructure of a floor which is to be constructed and concrete is poured thereabout in a conventional fashion. Once the floor is set, power and data/communication wires may now be run into the interior of the floor box 20 the access openings 46. As noted above, the present invention provides selectivity in that power and data/communication wires can be run through the access openings 46 provided adjacent any of the interior compartments 40. However, as also noted above, it is desirable to electrically isolate an interior compartment having high voltage wiring (power) from an interior compartment having low voltage wiring (data/communications).

Figure 3B:
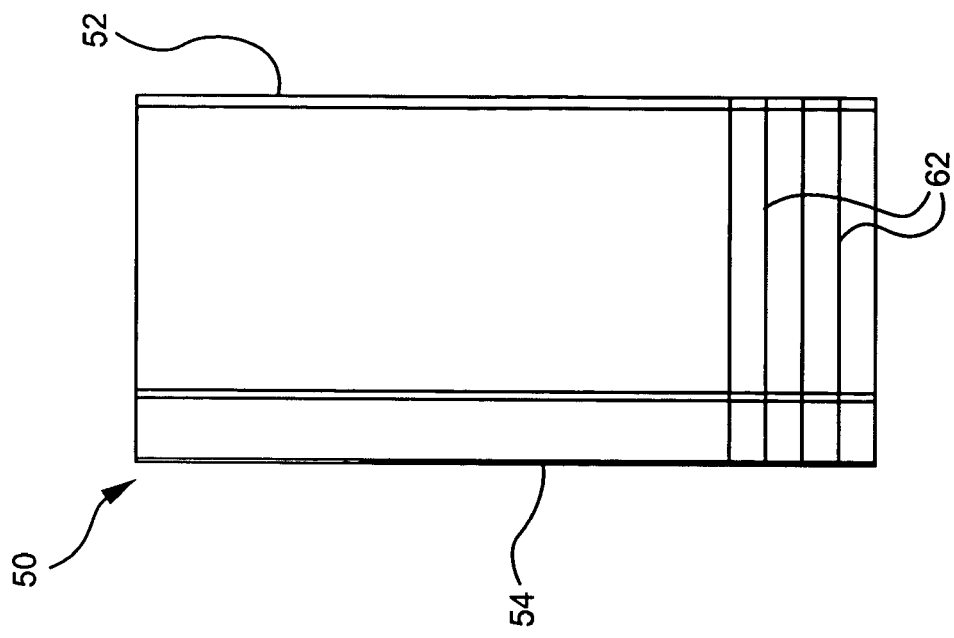
FIG. 3B is a side view of the divider of the present invention.
Figure 3A:
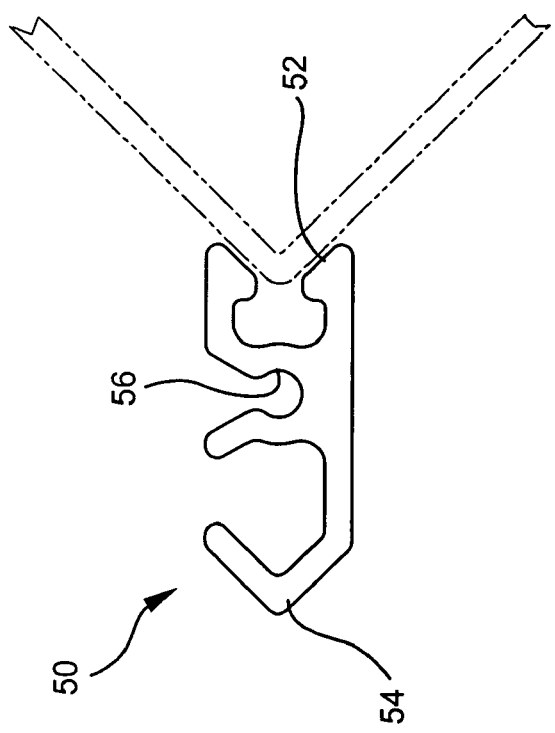
FIG. 3A is a top view of the divider of the present invention.
Figure 4:
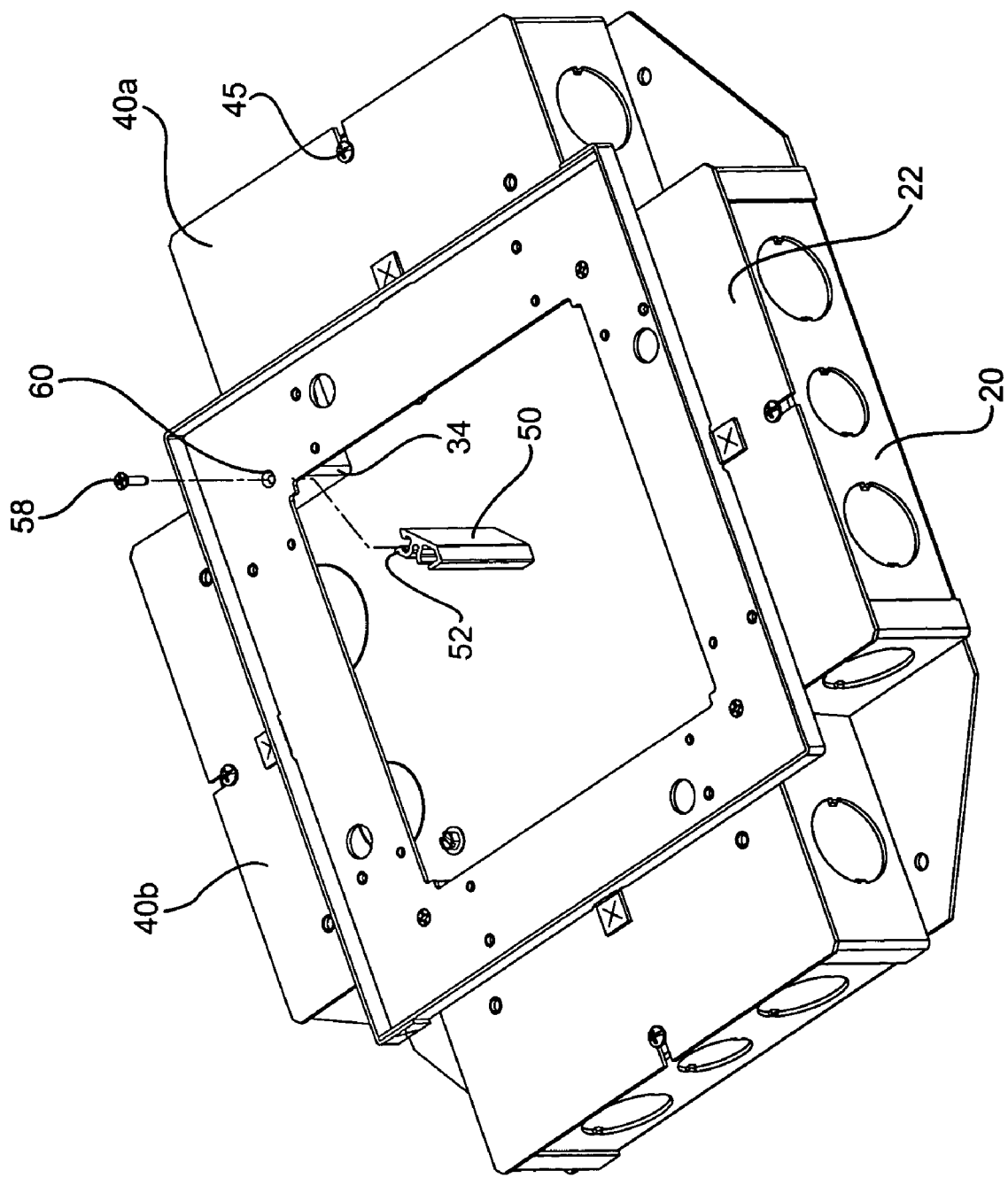
FIG. 4 is a top perspective view of the divider being installed in the floor box with the box cover attached to the floor box.

To achieve this goal, a divider 50 is provided which can be installed in the interior of the floor box 20 to separate adjacent wiring compartments 40. Referring now to FIGS. 3 and 4, the divider 50 is preferably an extrusion made from aluminum or a durable plastic material. The extruded divider 50 is generally rectangular in shape having a height substantially equal to the height of the perimetrical side wall 32 of the floor box 20. The extruded divider 50 further includes a groove 52 defining an inside corner formed in one lateral edge thereof and an outside corner 54 formed in the opposite lateral edge thereof. As will be explained in further detail below, upon installation, the inside corner 52 of the extruded divider 50 receives an inner corner 34 of the floor box side wall 32 and the outside corner 54 provides abutment surfaces for an electrical panel 26 and/or a communication panel 28. The extruded divider 50 further preferably includes a threaded aperture 56 formed in an upper longitudinal edge thereof. The threaded aperture 56 is used to secure the divider 50 in place to the box cover 22 with a screw 58. In the event that the aperture 56 is not threaded, a self-tapping screw 58 may be utilized.

Figure 5:
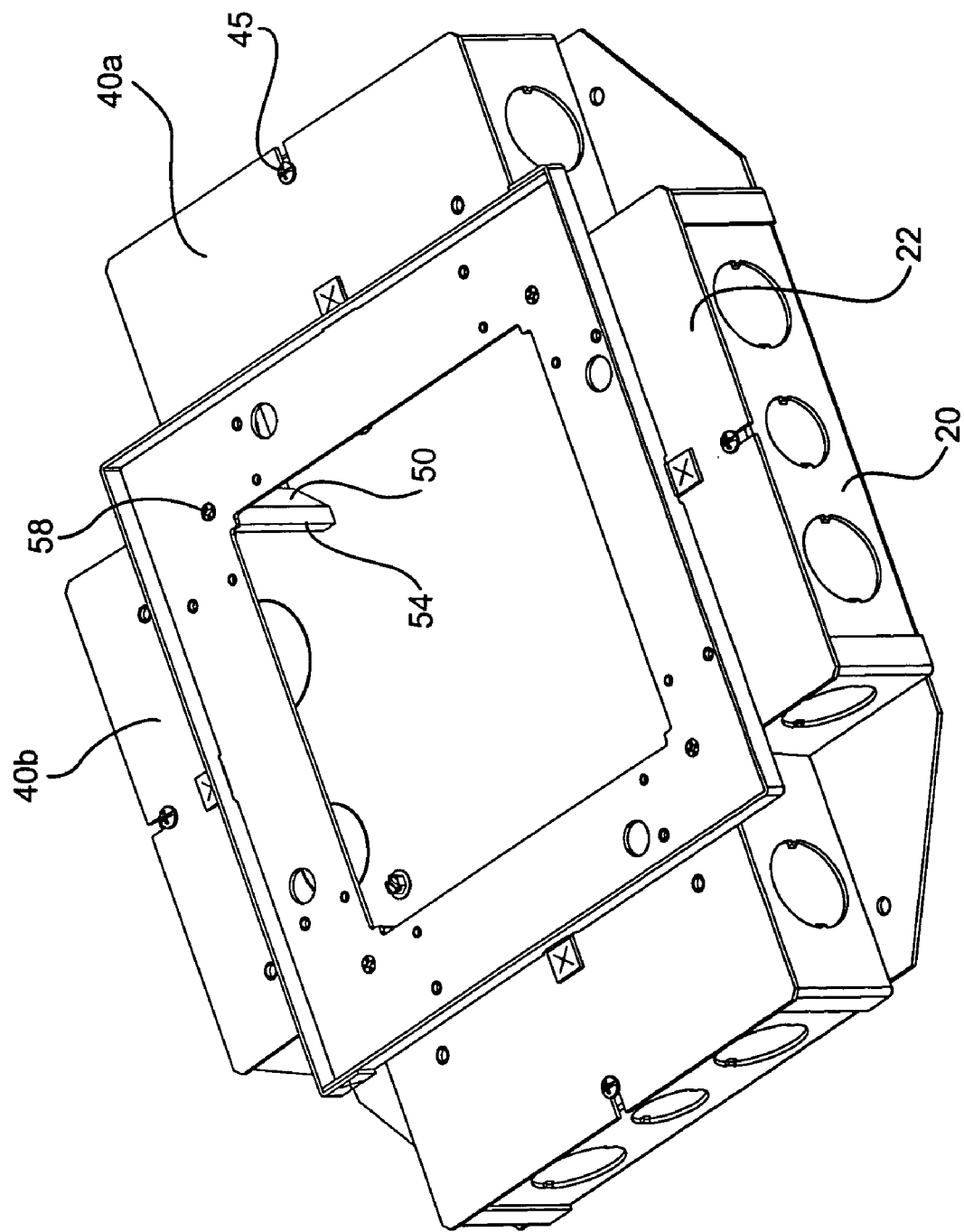
FIG. 5 is a top perspective view of the floor box assembly of the present invention with the divider in place.

Thus, once electrical wires are pulled into an electrical wiring compartment 40a, for example, and communication wires are pulled into an adjacent communication wiring compartment 40b, the floor box cover is attached to the floor box 20 with screws 45 and the divider 50 may be inserted into the interior of the floor box between the two adjacent compartments to separate the compartments, as shown in FIG. 4. The divider 50 is inserted into the box 20 so that the inside corner 52 of the divider rests against the inner corner 34 of the box side wall 32 between the adjacent wiring compartments 40a and 40b. The divider screw 58 is then inserted through an aperture 60 formed in the box cover 22 and fastened to the divider 50 to secure the divider in place, as shown in FIG. 5.

Prior to inserting the divider 50 into the floor box 20, the divider may be cut to an appropriate height. This is typically done by initially inserting the divider 50 into the floor box 20 and then marking the appropriate height. The divider 50 is then removed and cut at the marked location. In this regard, the divider 50 may be supplied having a standard height with a plurality of score lines 62 matching the various standard heights of floor boxes. The score lines 62 are positioned so that the lower end of the divider 50 may be cut to an appropriate height so as to be properly accommodated in a standard floor box 20 whose height has been selected based upon the type of floor poured. The score lines 62 are spaced apart a sufficiently small distance to provide the installer with appropriate height adjustment. It is contemplated that the score lines 62 may be in the form of creases to form snap-off locations to allow the installer to snap-off the lower end of the divider 50 at the appropriate height.

Figure 6:
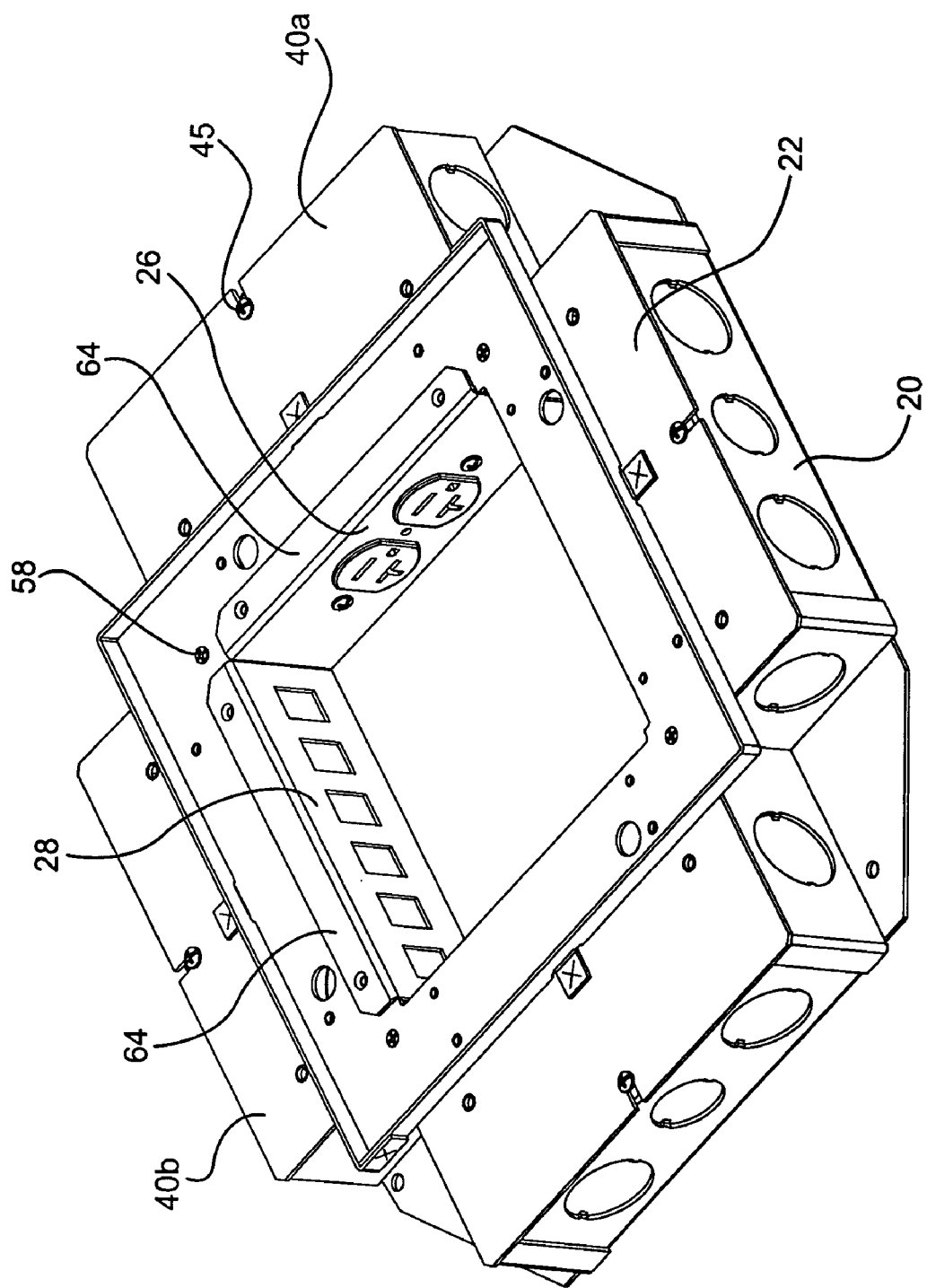
FIG. 6 is a top perspective view of the floor box assembly of the present invention with the electrical and communication panels installed.

Once the one or more dividers 50 have been installed, the electrical (high voltage-power) panel 26 and/or the communication (low voltage-data) panel 28 can be installed. Typically, the electrical fixture 14 and/or the communication fixture 14 will first be mounted to a respective panel 26 and/or 28 and the necessary wire connections from the respective conduits 16 and 18 can be made. The panels 26 and 28 with their associated fixture can then be attached to the box assembly. Preferably, the panels 26 and 28 include right-angle flanges 64 which can be secured to an upper surface of the box cover 22 with screws, as shown in FIG. 6. Furthermore, as mentioned above, the outside corner 54 of the divider 50 provides abutment faces for the plates 26 and 28 to facilitate installation.

Figure 7:
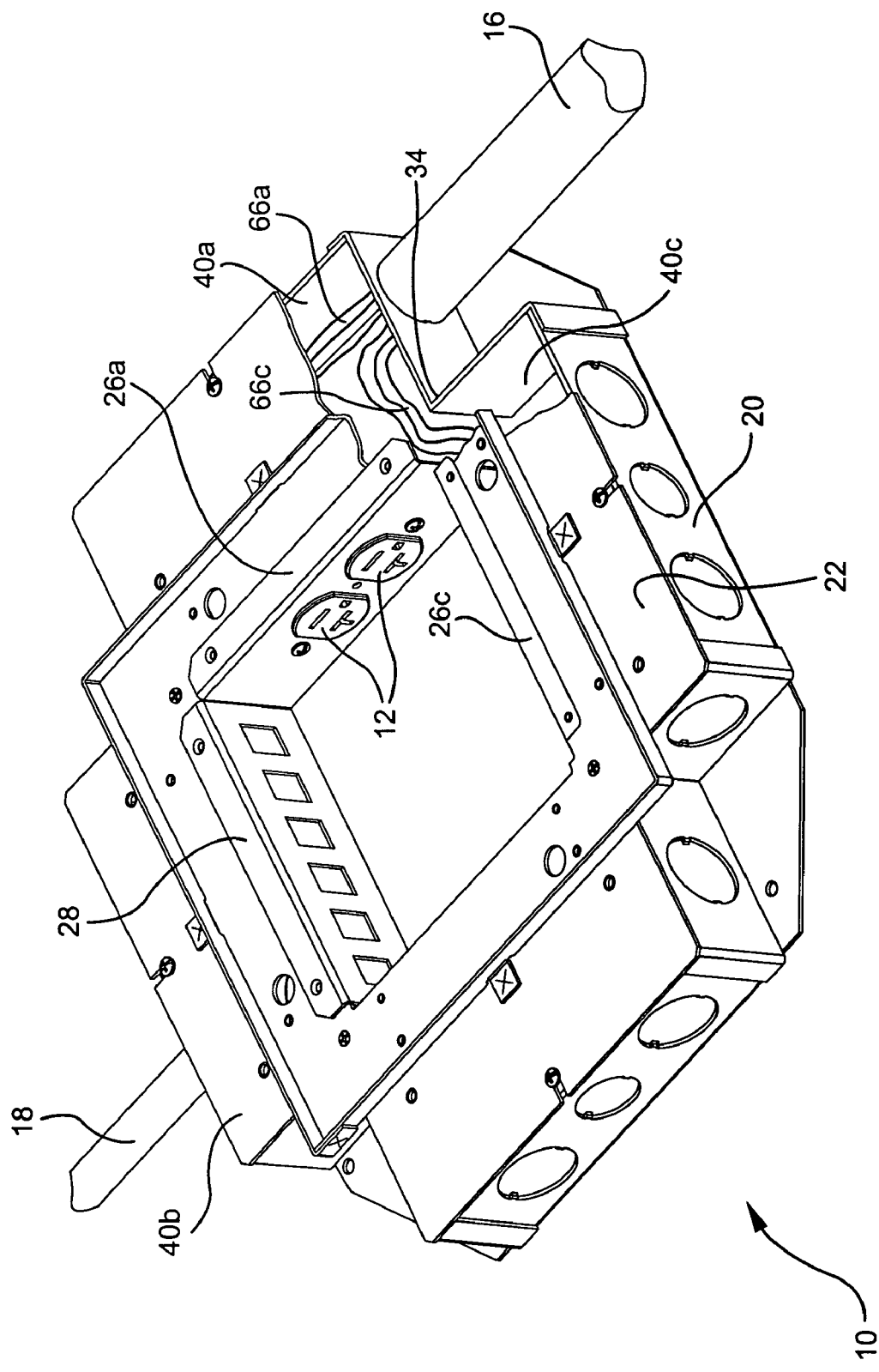
FIG. 7 is a top perspective, partial cut-away view of the floor box assembly of the present invention showing electrical wires being routed between adjacent wiring compartments.

As noted above, the present invention allows for the selection of which wiring compartments will be designated high voltage compartments and which compartments will be low-voltage compartments, wherein the divider is used to electrically insulate one type of compartment from the other. If, however, it is desired to have two similar compartments adjacent to each other, the divider can be simply removed from between the adjacent compartments. For example, FIG. 7 shows an electrical wiring conduit 16 being fed to an electrical wiring compartment 40a, whereas a communication conduit 18 is connected through a communication wiring compartment 40b. The electrical wiring conduit 16 contains a first set of electrical wires 66a being fed to a first electrical fixture 12 mounted to a first electrical panel 26 of a first electrical wiring compartment 40a. The electrical wiring conduit 16 further contains a second set of electrical wires 66c being fed to a second electrical fixture (not shown in FIG. 7) mounted to a second electrical panel 26c of a second electrical wiring compartment 40c of the box. As can be seen in the cut-away portion of the box shown in FIG. 7, a divider is therefore missing from the inner corner 34 of the box 20 between the first and second electrical wiring compartments 40a and 40c to permit the second set of electrical wires 66c to be fed from the electrical conduit 16 to the second electrical wiring compartment.

As a result of the present invention, a simple, easy to assemble and install electrical floor box is provided that can effectively isolate high voltage wiring compartments from low voltage compartments. Moreover, same type wiring between adjacent wiring compartments can be achieved by simply removing the divider between adjacent compartments. This arrangement eliminates the need for wiring tunnels that lie on the bottom floor of the box and feed wires between the compartments beneath the central space of the box. Additionally, the design of the divider allows it to be easily slid into and out of place from inside an already assembled floor box. Thus, electrical and/or communication face plates can be easily changed after the box has been installed.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. An outlet box for termination of electrical and communication wires comprising:
   a box including a floor and a sidewall extending upwardly from said floor, said box defining an interior therein;
   a cover attached to said box for at least partially enclosing said interior; and
   a divider attached to said cover between said box floor and said cover for dividing said interior into first and second wiring compartments adapted to respectively contain electrical and communication wires therein, wherein said box sidewall forms an inner corner partially separating said first wiring compartment from said second wiring compartment, said divider abutting against said corner to divide said first and second wiring compartments.

2. An outlet box as defined in claim 1, wherein said divider includes a groove formed in a lateral edge thereof for receiving said inner corner of said box.

3. An outlet box for termination of electrical and communication wires comprising:
   a box including a floor and a sidewall extending upwardly from said floor, said box defining an interior therein;
   a cover attached to said box for at least partially enclosing said interior; and
   a divider attached to said cover between said box floor and said cover for dividing said interior into first and second wiring compartments adapted to respectively contain electrical and communication wires therein, wherein said box floor and sidewall form a box interior having a generally rectangular central space and four generally rectangular compartments extending diametrically outward from said central space, said compartments defining said first and second wiring compartments and further defining third and fourth wiring compartments.

4. An outlet box for termination of electrical and communication wires comprising:
   a box including a floor and a sidewall extending upwardly from said floor, said box defining an interior therein;
   a cover attached to said box for at least partially enclosing said interior;
   a divider attached to said cover between said box floor and said cover for dividing said interior into first and second wiring compartments adapted to respectively contain electrical and communication wires therein; and
   a panel disposed between said box floor and said cover for enclosing at least one of said first and second wiring compartments, and wherein said divider includes an abutment surface for abutting said panel thereagainst.

5. An outlet box for termination of electrical and communication wires comprising:
   a box including a floor and a sidewall extending upwardly from said floor, said box defining and interior therein;
   a cover attached to said box for at least partially enclosing said interior;
   a divider attached to said cover between said box floor and said cover for dividing said interior into first and second wiring compartments adapted to respectively contain electrical and communication wires therein, wherein said divider includes an aperture formed in an upper edge thereof for securing the divider to said cover.

6. An outlet box for termination of electrical and communication wires comprising:
   a box including a floor and a sidewall extending upwardly from said floor, said box defining an interior therein;
   a cover attached to said box for at least partially enclosing said interior;
   a divider attached to said cover between said box floor and said cover for dividing said interior into first and second wiring compartments adapted to respectively contain electrical and communication wires therein, wherein said divider includes a plurality of score lines disposed thereon for facilitating adjustment of the height of said divider to match a height of said box sidewall.

7. An outlet box as defined in claim 6, wherein said score lines comprise creases to facilitate breaking off a portion of said divider.

8. An outlet box assembly for termination of electrical and communication wires comprising:
   a box including a floor and a sidewall extending upwardly from said floor, said floor and said sidewall defining an interior having a central space and at least two compartments extending outward from said central space, said sidewall further defining an inner corner partially separating said two wiring compartments;
   a cover attached to said box for at least partially enclosing at least one of said two box compartments; and
   a divider extending between said box floor and said cover and abutting against said box sidewall inner corner to divide said two wiring compartments, said divided box compartments adapted to respectively contain electrical and communication wires therein.

9. An outlet box as defined in claim 8, wherein said divider is attached to said cover.

10. An outlet box as defined in claim 9, wherein said divider is removably attachable to said cover while said cover is attached to said box.

11. An outlet box as defined in claim 8, wherein said divider includes a groove formed in a lateral edge thereof for receiving said inner corner of said box.

12. An outlet box as defined in claim 8, wherein said box floor and sidewall form a box interior having a generally rectangular central space and four generally rectangular compartments extending diametrically outward from said central space, said compartments defining said first and second wiring compartments and further defining third and fourth wiring compartments.

13. An outlet box as defined in claim 8, further comprising a panel disposed between said box floor and said cover for enclosing at least one of said first and second wiring compartments, and wherein said divider includes an abutment surface for abutting said panel thereagainst.

14. An outlet box as defined in claim 8, wherein said divider includes an aperture formed in an upper edge thereof for securing the divider to said cover.

15. An outlet box as defined in claim 8, wherein said divider includes a plurality of score lines disposed thereon for facilitating adjustment of the height of said divider to match a height of said box sidewall.

16. An outlet box as defined in claim 15, wherein said score lines comprise creases to facilitate breaking off a portion of said divider.

17. A method for separating electrical wires from communication wires contained together in an outlet box assembly comprising the steps of:
   forming a box including a floor and a sidewall extending upwardly from said floor, said box defining an interior therein;
   attaching a cover to said box to at least partially enclose said interior;
   inserting a divider between said box floor and said cover after attachment of said cover to said box for dividing said box interior into first and second wiring compartments;
   providing electrical wires in said first wiring compartment; and providing communication wires in said second wiring compartment, wherein said electrical wires are separated from said communication wires by said divider,
   wherein said divider insertion step comprises the step of abutting an inside corner of said divider against an inner corner of said box sidewall formed between said first and second wiring components.

18. A method for separating electrical wires from communication wires contained together in an outlet box assembly comprising the steps of:
forming a box including a floor and a sidewall extending upwardly from said floor, said box defining an interior therein;
attaching a cover to said box to at least partially enclose said interior;
inserting a divider between said box floor and said cover after attachment of said cover to said box for dividing said box interior into first and second wiring compartments;
providing electrical wires in said first wiring compartment;
providing communication wires in said second wiring compartment, wherein said electrical wires are separated from said communication wires by said divider; and
removing a portion of said divider to adjust the height thereof prior to insertion between said box floor and said cover.

19. A method for separating electrical wires from communication wires contained together in an outlet box assembly comprising the steps of:
forming a box including a floor and a sidewall extending upwardly from said floor, said box defining an interior therein;
attaching a cover to said box to at least partially enclose said interior;
inserting a divider between said box floor and said cover after attachment of said cover to said box for dividing said box interior into first and second wiring compartments;
providing electrical wires in said first wiring compartment;
providing communication wires in said second wiring compartment, wherein said electrical wires are separated from said communication wires by said divider; and
installing a panel to enclose one of said first and second wiring components, wherein said panel is abutted against an abutment surface of said divider.

20. An outlet box for termination of electrical and communication wires comprising:
a box including a floor and a sidewall extending upwardly from said floor, said box defining an interior therein;
a cover attached to said box for at least partially enclosing said interior;
a divider attached to said cover between said box floor and said cover for dividing said interior into first and second wiring compartments adapted to respectively contain electrical and communication wires therein, wherein said divider has a height substantially equal to a height of said box sidewall for electrically isolating said first wiring compartment from said second wiring compartment.

21. A method for separating electrical wires from communication wires contained together in an outlet box assembly comprising the steps of:
forming a box including a floor and a sidewall extending upwardly from said floor, said box defining an interior therein;
attaching a cover to said box to at least partially enclose said interior;
inserting a divider between said box floor and said cover after attachment of said cover to said box for dividing said box interior into first and second wiring compartments;
providing electrical wires in said first wiring compartment; and
providing communication wires in said second wiring compartment, wherein said electrical wires are separated from said communication wires by said divider,
wherein said divider has a height substantially equal to a height of said box sidewall for electrically isolating the electrical wires in said first wiring compartment from the communication wires in said second wiring compartment.

* * * * *